(12) United States Patent
James et al.

(10) Patent No.: US 6,345,352 B1
(45) Date of Patent: Feb. 5, 2002

(54) METHOD AND SYSTEM FOR SUPPORTING MULTIPROCESSOR TLB-PURGE INSTRUCTIONS USING DIRECTED WRITE TRANSACTIONS

(75) Inventors: David V. James, Palo Alto; Donald N. North, Saratoga, both of CA (US)

(73) Assignee: Apple Computer, Inc., Cupertino, CA (US)

( * ) Notice: Subject to any disclaimer, the term of this patent is extended or adjusted under 35 U.S.C. 154(b) by 0 days.

(21) Appl. No.: 09/163,306

(22) Filed: Sep. 30, 1998

(51) Int. Cl.[7] .............................................. G06F 12/00
(52) U.S. Cl. ........................ 711/210; 711/207; 711/219
(58) Field of Search ................................. 711/210, 205, 711/219, 108, 128, 207

(56) References Cited

U.S. PATENT DOCUMENTS

| 5,671,391 | A | * | 9/1997 | Knotts ........................ 711/143 |
|---|---|---|---|---|
| 5,787,476 | A | * | 7/1998 | Laudon et al. ............... 711/141 |
| 5,835,928 | A | * | 11/1998 | Auslander et al. ............. 711/3 |
| 5,892,970 | A | * | 4/1999 | Hagersten ...................... 710/5 |
| 5,915,025 | A | * | 6/1999 | Taguchi et al. ................ 380/44 |
| 6,000,006 | A | * | 12/1999 | Bruce et al. ................. 711/103 |
| 6,012,135 | A | * | 1/2000 | Leedom et al. ............. 711/208 |

* cited by examiner

Primary Examiner—Matthew Kim
Assistant Examiner—Matthew D. Anderson
(74) Attorney, Agent, or Firm—Burns Doane Swecker & Mathis, L.L.P.

(57) ABSTRACT

A method and system for purging translation lookaside buffers (TLB) of a computer system are described. Directed write transactions can be used to avoid deadlock and avoid the need for additional bridge buffers. Broadcast emulation can be achieved by linking the nodes in a doubly-linked list and having neighboring nodes notify each other of changes in TLB entries.

41 Claims, 2 Drawing Sheets

METHOD AND SYSTEM FOR SUPPORTING MULTIPROCESSOR TLB-PURGE INSTRUCTIONS USING DIRECTED WRITE TRANSACTIONS

BACKGROUND

The present invention relates generally to multiprocessor systems and, more particularly, to systems and techniques for maintaining translation lookaside buffers (TLBs) in multiprocessor systems.

As the performance demands on personal computers continue to increase at a meteoric pace, processors have been developed which operate at higher and higher clock speeds. The instruction sets used to control these processors have been pared down (e.g., RISC architecture) to make them more efficient. Processor improvements alone, however, are insufficient to provide the greater performance required by computer users. The other computer subsystems which support the processor, e.g., interconnects, I/O devices and memory devices, must also be designed to operate at higher speeds and support greater bandwidth. In addition to improved performance, cost has always been an issue with computer users. Thus, system designers are faced with the dual challenges of improving performance while remaining competitive on a cost basis.

Early personal computers typically included a central processing unit (CPU), some type of memory and one or more input/output (I/O) devices. One of the common cost/performance design tradeoffs referred to above involves the consideration of how much main memory to provide to a computer. Considering current consumer desire for multimedia applications, many personal computers are designed with large amounts of main memory, e.g., 32 MB RAM. However, RAM chips are expensive and, therefore, techniques have been developed to obtain greater performance from a given memory capacity.

One such technique, which is well known to those skilled in the art, is the use of virtual memory. Virtual memory is based on the concept that, when running a program, the entire program need not be loaded into main memory at one time. Instead, the computer's operating system loads sections of the program into main memory from a secondary storage device (e.g., a hard disk drive) as needed for execution. To make this scheme viable, the operating system maintains tables which keep track of where each section of the program resides in main memory and secondary storage. As a result of executing a program in this way, the program's logical addresses no longer correspond to physical addresses in main memory. To handle this situation the CPU maps the program's effective or virtual addresses into their corresponding physical addresses.

The sections of the program which are manipulated by the CPU in the manner described above are commonly referred to as "pages". As part of the mapping process, the CPU maintains a page table which contains various information associated with the program's pages. For example, a page table entry can contain a validity bit, which indicates whether the page associated with this particular entry is currently stored in main memory, and a dirty bit which indicates whether the program has modified the page.

Many systems store the page table in main memory. Thus, accessing a page potentially requires two main memory accesses: a first to determine the location of a particular page and a second to access that page. To reduce the overhead associated with this activity, some systems provide a special cache memory, known as a translation lookaside buffer (TLB), which holds page table entries for the most recently accessed pages that are currently stored in main memory. The CPU forwards virtual addresses to the TLB which produces a physical page location indication if it holds an entry for the page of interest. Otherwise, the CPU consults the page table in main memory to obtain access information for this page. When a page is removed from main memory, for example, a TLB entry (if one exists) associated with that page is purged.

The advent of multiprocessor architectures for personal computers is a recent trend in the design of these systems, intended to satisfy consumers' demand for ever faster and more powerful personal computers. In a typical multiprocessor computer system each of the processors may share one or more resources. Note, for example, the multiprocessor system depicted in FIG. 1. Therein, an exemplary multiprocessor system 5 is illustrated having seven nodes including a first CPU 10, a bridge 12 for connecting the system 5 to other I/O devices 13, first and second memory devices 14 and 16, a frame buffer 18 for supplying information to a monitor, a direct memory access (DMA) device 20 for communicating with a storage device or a network and a second CPU 22 having an SRAM device 24 connected thereto. According to the conventional paradigm, these nodes would be interconnected by a bus 26. Caches can be provided as shown to isolate some of the devices from the bus and to merge plural, small bus accesses into larger, cache-line sized accesses.

As multiprocessor systems grow more complex, i.e., are designed with more and more nodes, adapting the bus-type interconnect to handle the increased complexity becomes problematic. For example, capacitive loading associated with the conductive traces on the motherboard which form the bus becomes a limiting factor with respect to the speed at which the bus can be driven. Thus, an alternative interconnect architecture is desirable.

One type of proposed interconnect architecture for multiprocessor personal computer systems replaces the bus with a plurality of unidirectional point-to-point links and uses packet data techniques to transfer information. FIGS. 2(a) and 2(b) conceptualize the difference. FIG. 2(a) depicts four of the nodes from FIG. 1 interconnected via a conventional bus. FIG. 2(b) illustrates the same four nodes interconnected via unidirectional point-to-point links 30, 32, 34 and 36. These links can be used to provide bus-like functionality by connecting the links into a ring (which structure is sometimes referred to herein as a "ringlet") and having each node pass-through packets addressed to other nodes. Ringlets overcome the aforementioned drawback of conventional bus-type interconnects since their individual links can be clocked at high speeds regardless of the total number of nodes which are linked together.

Like single processor systems, multiprocessor systems can use virtual memory techniques to enhance memory performance. Thus, each processor in the multiprocessor system may have its own TLB, which creates the potential for noncoherency between the various TLB caches. For example, if the first CPU 10 changes an entry, e.g., marks that entry invalid or changes a page address, in its TLB (not shown in FIG. 1), then it would be desirable to update the corresponding entry in the TLB of the second CPU 22.

Conventionally, multiprocessor systems have accomplished this task by broadcasting special TLB-purge instructions on the device interconnect which identify the virtual address that should be invalidated. This conventional mechanism for maintaining coherence between the various processors in a multiprocessor system has several drawbacks. For example, the broadcast TLB solution lacks robustness since no positive feedback is provided by the recipient CPUs that the TLB purge was received and performed. More specifically, these conventional solutions simply provided the recipient CPUs with a "wired-OR" busy signal line that was driven when the CPU was busy. If the broadcasting CPU didn't see a busy signal, it presumed that the TLB purge was received and performed, which assumption may be inaccurate.

A second drawback associated with these conventional TLB-purge solutions involves the manner in which read/write dependencies are handled, particularly in conjunction with bridges between different systems. Consider the situation where, for example, a CPU has a pending read transaction at the time that the TLB-purge command is broadcast. In this situation, the recipient CPU will assert a busy signal and complete its read transaction, whereupon the TLB-purge command is rebroadcast. This functionality becomes more complicated where the TLB-purge is also communicated across a bridge to CPUs residing on an adjacent interconnect. Bridges use queues to transfer commands and data between the adjacent systems, typically one queue for requests and one for responses. However, attempting to queue TLB-purge broadcast commands among the requests or responses in a bridge queue would result in deadlock. Additional queues could be added to the bridges solely to support TLB-purge broadcasts, however this would undesirably add to the cost of bridges and would not solve the aforedescribed robustness problem.

Accordingly, it would be desirable to provide a more robust mechanism for purging TLBs in a multiprocessor system that also does not require special bridge queues.

SUMMARY

These and other drawbacks and limitations of conventional TLB-purge schemes and systems are overcome according to exemplary embodiments of the present invention. According to one exemplary embodiment, directed write transactions are used to purge TLB entries. For example, when a node (e.g., a processor) modifies an entry in its TLB, it broadcasts a TLB invalidate request transaction which includes an identity of the TLB entry to be purged and a callback address. When the recipient nodes have completed the purging operation, each node sends a directed write transaction to the call back address. The call back address can be used as a counter to record the number of confirmations received. The node which sent the broadcast can monitor the call back address to determine if all of the recipient nodes have confirmed the TLB purge command and, as necessary, can rebroadcast this command.

According to another exemplary embodiment, broadcast functionality can be emulated for systems that don't support broadcast commands. For example, the nodes can be linked using a doubly-linked list implemented as a calling-list register in each node. When a node modifies its TLB entry, that node sends a directed write command to the entry (or entries) in its calling-list register informing this node or nodes of the change. This node (or nodes) in turn sends a message to those node(s) identified in its calling-list register, and so on until the end of the chain is reached. At this time, confirmation messages can be sent back through the list until the originating node receives the confirmation(s).

BRIEF DESCRIPTION OF THE DRAWINGS

The foregoing, and other, objects, features and advantages of the present invention will be more readily understood upon reading the following detailed description in conjunction with the drawings in which.

DETAILED DESCRIPTION

To provide some context within which to describe exemplary systems and techniques for handling TLB-purging according to the present invention, exemplary embodiments will now be described with respect to FIGS. 3–7. To simplify the following discussions, although the exemplary multiprocessor systems used herein do depict a bus-type of interconnect, those skilled in the art will appreciate that the present invention can be used with any type of interconnect, e.g., a ringlet.

Figure 1:
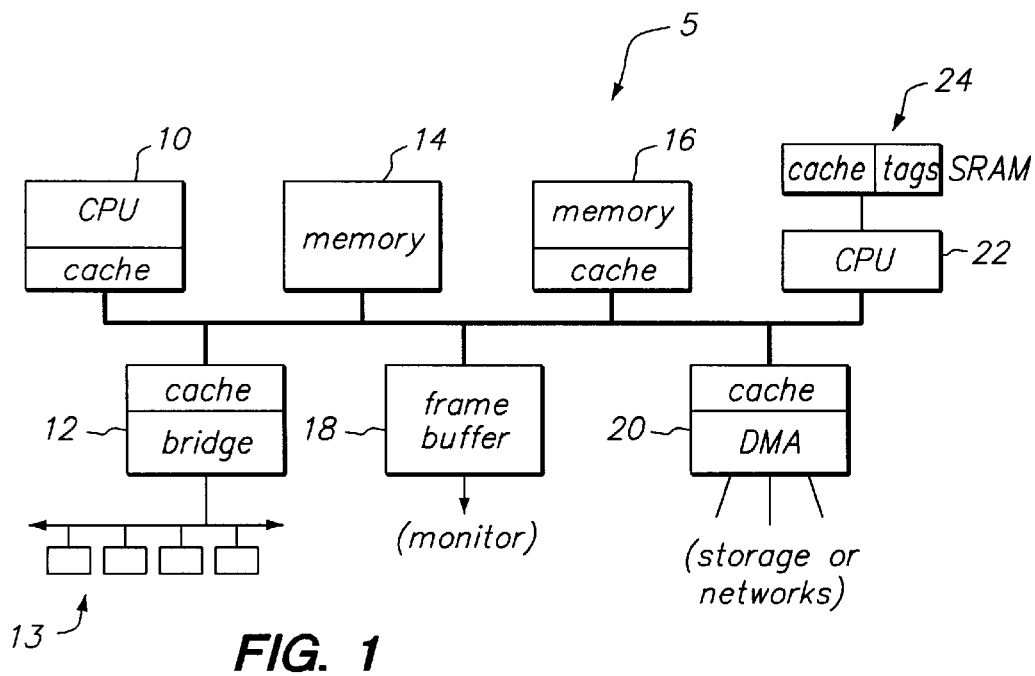
FIG. 1 is a block diagram of an exemplary multiprocessor system.
Figure 2A:
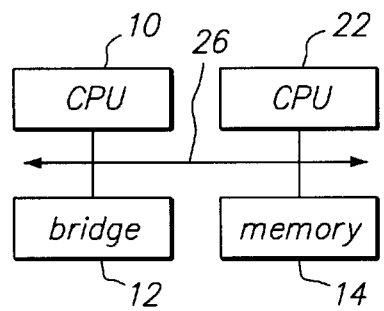
FIGS. 2(a) and 2(b) are block diagrams of multinode systems which conceptually illustrate the difference between bus-type interconnects and ringlet-type interconnects.
Figure 2B:
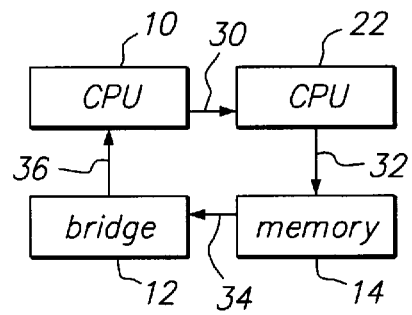
Figure 3:
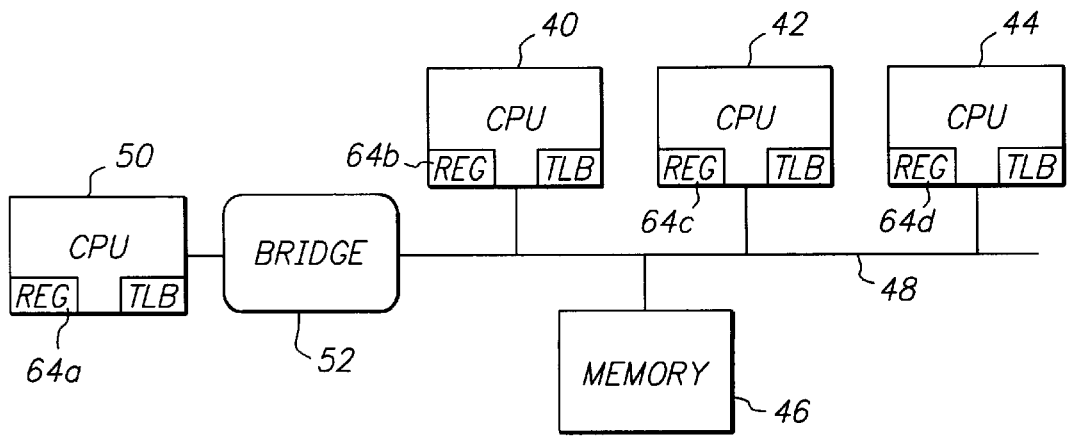
FIG. 3 is a block diagram representation of an exemplary multiprocessor system including TLBs and a bridge which interconnects different systems.
Figure 4:
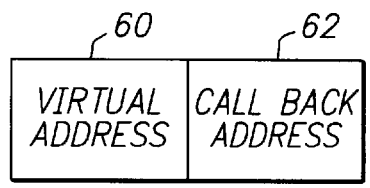
FIG. 4 illustrates a portion of a TLB-purge command according to an exemplary embodiment of the present invention.
Figure 5:
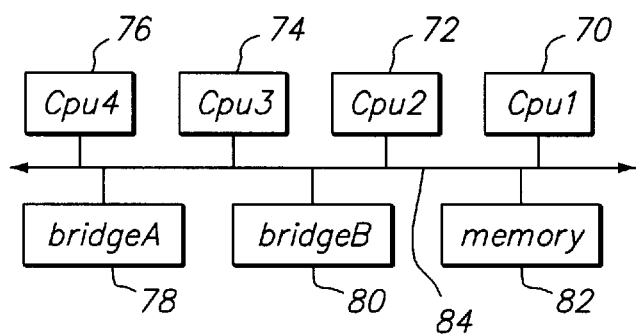
FIG. 5 illustrates another multiprocessor system used to describe a second exemplary embodiment of the present invention.
Figure 6:
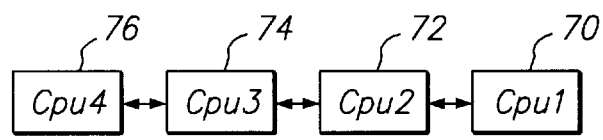
FIG. 6 depicts the multiprocessor system of FIG. 5 as a doubly-linked list.

In FIG. 3, an exemplary system is depicted including three CPUs 40, 42 and 44 and a memory device 46 interconnected via a local bus 48. The local bus 48 is connected to another CPU 50 by bridge 52. Each CPU 40, 42, 44 and 50 has its own TLB as shown. Suppose that CPU 40 invalidates an entry in its TLB and then wants to inform the other CPUs 42, 44 and 50 of this action to maintain TLB coherency. Exemplary embodiments of the present invention provide this functionality in a robust manner while avoiding the deadlock problems associated with communicating this information, e.g., over bridge 52.

According to a first exemplary embodiment, this can be accomplished by using separate transactions to accomplish, first, the TLB purge and, second, positive feedback from each purging CPU which indicates that the TLB purge has been performed. For example, CPU 40 can transmit a TLB purge command, e.g., in the form of a data packet, which includes, among other fields, those shown in FIG. 4. Therein, the TLB purge command includes a first field 60 which identifies the TLB entry to be purged by its associated virtual address. Additionally, the TLB purge command includes a second field 62 which identifies a call back address to which each of the recipient CPUs respond after they have performed the TLB purge, as will be described in more detail below. TLB purge commands according to this exemplary embodiment of the present invention can be issued using standard write commands or, when supported, more efficient move commands having two values transmitted in the payload thereof, so that the bridge 52 does not need to have additional queues associated with a special TLB purge command to avoid deadlock. For the purposes of illustrating exemplary embodiments of the present invention, WRITE commands will be described, however those skilled in the art will also appreciate that MOVE commands could be substituted therefore.

After the recipient CPUs 42, 44 and 50 receive the TLB purge command from CPU 40, they await resolution of any pending read and/or write transactions associated with the virtual address 60 identified in the TLB purge command. Then, after invalidating the TLB entry associated with that virtual address, each of CPUs 42, 44 and 50 initiate another write transaction directed to the address specified in call back address field 62. For TLB purges issued by CPU 40, the command would identify a memory location on CPU 40 that functions as a register 64b, which register is monitored by the initialing CPU 40. At the start of the TLB purge process, register 64 may be set to a count value (which count value can be set at system initialization) that identifies the number of CPUs from which TLB purge confirmations are expected. In this case, register 64 would have an initial count value of three.

Thus, when confirming the performance of the TLB purge requested by CPU 40, CPU 42 would send a write command to the call back address identified in field 62, e.g., a fetch and decrement command, that reduces the count value by 1. If CPU 40 notes that the count value has not reached zero within some predetermined time, i.e., indicating that at least one recipient has not confirmed TLB purge performance, then CPU 40 can restart the TLB purge sequence by retransmitting the TLB purge command for this entry. Those skilled in the art will appreciate that the operation of register 64 as a counter can be implemented in many alternative ways such that an initiating processor can determine if all of the other processors have confirmed purging their TLBs, e.g., by starting with a count value of zero and specifying that each confirming processor will send a write command that increments the counter.

The foregoing exemplary embodiment teaches a technique for adding robustness to broadcast TLB purge commands and avoiding bridge-created deadlock situations. Some system interconnect devices many not support broadcast functionality in general and broadcast TLB-purge commands specifically. According to exemplary embodiments of the present invention, therefore, it may be desirable to emulate broadcast functionality using a sequence of directed transactions. This emulation is facilitated using calling-list registers. Consider the exemplary node topology of FIG. 5 including four CPUs 70–76, two bridges 78 and 80 and a memory device 82 interconnected by bus 84. If bus 84 does not support broadcast TLB-purge commands, this exemplary embodiment provides for calling registers which operate to create a doubly-linked list, e.g., a linear list or a binary tree, of the nodes to which a broadcast TLB-purge command would be directed as illustrated, for example, in FIG. 6. Thus, each node's calling register will store the identity of the upstream and downstream nodes to which it is to pass commands associated with a TLB-purge command as described below.

According to this exemplary embodiment of the present invention, TLB-purge commands are implemented as a two-phase sequence. During the first phase, a plurality of write or move commands will be promulgated through the nodes using the doubly-linked list created by the calling registers. For example, suppose that CPU 74 invalidates an entry in its TLB. Then, CPU 74 initiates two WRITE transactions to the nodes listed in its calling register, i.e., one for CPU 76 and one for CPU 72, which identify the virtual address of the associated TLB entry to be invalidated. The WRITE command will target a first predetermined memory location in the processor node which is dedicated for TLB-purge transactions, such that the processor interprets a write to this first predetermined memory location as an instruction to purge the TLB entry associated with the value written to this memory location. This message is then forwarded by CPU 72 onto CPU 70, which is identified in its call-list register. The first phase is completed when the ends of the list are reached, e.g., when the message reaches CPUs 70 and 76.

The second phase provides confirmation of the TLB-purge from each processor. The head/tail entries in the list, e.g., CPUs 70 and 76, each generate a new WRITE command directed to a second predetermined memory location. This new WRITE or MOVE command is sent to the processor, i.e., in this case "neighboring" CPUs 74 and 72, respectively, identified by the call-list. Processors which were recipients of the original WRITE command will, after purging their own TLB entry (if any), forward the confirmation message to the next downstream processor. When the initiating CPU, in this case CPU 74, receives a write to the second predetermined memory location from both CPU 76 and CPU 72, it will interpret these two transactions as a complete confirmation of its TLB-purge command.

Figure 7:
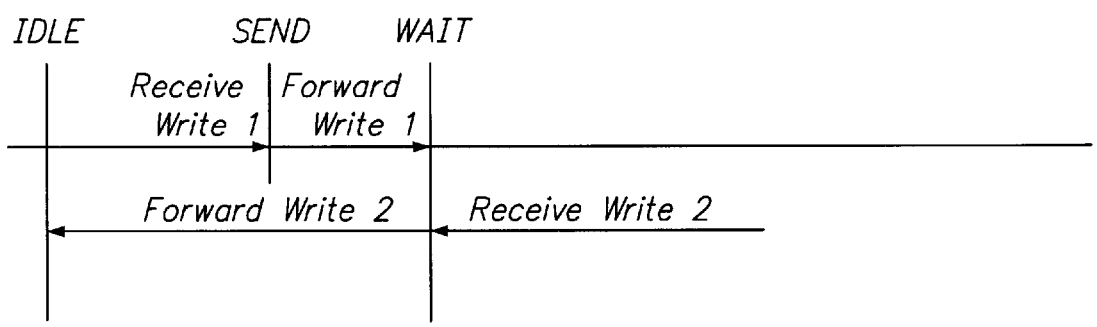
FIG. 7 is a state diagram associated with the operation of one of the processors in FIGS. 5 and 6 operating in accordance with the second exemplary embodiment of the present invention.

From the perspective of processor 72, the foregoing exemplary embodiment can be visualized as having certain states associated with the TLB-purge sequence as seen in FIG. 7. Therein, processor 72 is initially in an IDLE state wherein it has not received any transactions with respect to the first predetermined memory location that has been reserved for requesting a TLB-purge. Then, upon receipt of a WRITE directed to that first predetermined memory location, processor 72 will transition to a SEND state, at which time it will forward the WRITE command to the processor identified in its call-list. After forwarding the message, processor 72 will then enter a WAIT state. During this time, processor 72 will resolve any read/write dependencies associated with the requested purging of a TLB entry and await confirmation from the processor to which it forwarded the first message. Upon receipt of the WRITE command which changes the value stored at the second predetermined memory location, the processor 72 will forward this message if it has resolved any read/write dependencies and completed its own TLB purge. Otherwise, it will delay forwarding the message until these criteria are satisfied.

By using standard write transactions directed to special memory offsets within the processor, these exemplary embodiments of the present invention avoid the need for additional bridge queues. Moreover, the inventive techniques support a wide range of vendor-dependent special purpose features, allowing heterogenous CPU architectures, which may have distinct TLB management structures, to be easily supported. Further, like the earlier described exemplary embodiments, those described with respect to FIGS. 5–7 also provide a robust, positive confirmation regarding the performance of TLB purges.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims.

What is claimed:

1. A computer system, comprising:
a plurality of interconnected nodes each having a translation lookaside buffer (TLB) for storing virtual memory address conversion information; and
a calling-list register that stores an identity of at least one other interconnected node,
wherein each of said plurality of interconnected nodes has a calling-list register,
wherein said identity of said at least one other interconnected node stored in each calling-list register is different for each calling-list register, and
wherein when one of said plurality of interconnected nodes modifies an entry in its TLB, said one of said plurality of interconnected nodes informs said at least one other interconnected node having an identity stored in said calling-list register of said one of said plurality of interconnected nodes of said modified entry, and said at least one other interconnected node sends a confirmation message to said one of said plurality of interconnected nodes having an identity stored in said calling-list register of said at least one other interconnected node after said entry has been modified.

2. The computer system of claim 1, wherein said computer system does not support functionality to broadcast a command, from said one of said plurality of interconnected nodes, to modify a corresponding TLB entry in TLBs of other of said plurality of interconnected nodes.

3. The computer system of claim 1, wherein said one of said plurality of interconnected nodes and said at least one other interconnected node are neighboring nodes.

4. The computer system of claim 1, wherein said plurality of interconnected nodes are connected in a ring using a plurality of point-to-point links.

5. The computer system of claim 1, wherein said one of said plurality of interconnected nodes is a central processing unit.

6. The computer system of claim 1, wherein said one of said plurality of interconnected nodes informs said at least one other interconnected node by sending a command to said at least one other interconnected node that includes a virtual address of said entry to be modified in said at least one other interconnected node.

7. The computer system of claim 6, wherein said at least one other interconnected node modifies said entry when a predetermined memory location in said at least one other interconnected node is updated with said virtual address of said entry to be modified.

8. The computer system of claim 1, wherein said confirmation message includes a command to modify a predetermined memory location in said one of said plurality of interconnected nodes.

9. A method for purging translation lookaside buffers (TLBs) of a computer system that includes a plurality of interconnected nodes each having a TLB for storing virtual memory address conversion information, comprising the steps of:
storing an identity of at least one other interconnected node in a calling-list register, wherein each of said plurality of interconnected nodes has a calling-list register, and wherein said identity of said at least one other interconnected node stored in each calling-list register is different for each calling-list register;
modifying an entry in said TLB associated with one of said plurality of interconnected nodes;
informing said at least one other interconnected node having an identity stored in said calling-list register of said one of said plurality of interconnected nodes of said modified entry; and
sending a confirmation message from said at least one other interconnected node to said one of said plurality of interconnected nodes having an identity stored in said calling-list register of said at least one other interconnected node after said entry has been modified.

10. The method of claim 9, wherein said computer system does not support functionality to broadcast a command, from said one of said plurality of interconnected nodes, to modify a corresponding TLB entry in TLBs of other of said plurality of interconnected nodes.

11. The method of claim 9, wherein said one of said plurality of interconnected nodes and said at least one other interconnected node are neighboring nodes.

12. The method of claim 9, wherein said plurality of interconnected nodes are connected in a ring using a plurality of point-to-point links.

13. The method of claim 9, wherein said one of said plurality of interconnected nodes is a central processing unit.

14. The method of claim 9, wherein said step of informing comprises the step of:
sending a command to said at least one other interconnected node that includes a virtual address of said entry to be modified in said at least one other interconnected node.

15. The method of claim 14, wherein said at least one other interconnected node modifies said entry when a predetermined memory location in said at least one other interconnected node is updated with said virtual address of said entry to be modified.

16. The method of claim 9, wherein said confirmation message includes a command to modify a predetermined memory location in said one of said plurality of interconnected nodes.

17. A computer-readable medium containing a computer program that performs the steps of:
storing an identity of at least one other interconnected node in a calling-list register, wherein each of a plurality of interconnected nodes has a calling-list register, wherein said identity of said at least one other interconnected node stored in each calling-list register is different for each calling-list register, and wherein each of said plurality of interconnected nodes has a translation lookaside buffer (TLB) for storing virtual memory address conversion information;
modifying an entry in said TLB associated with one of said plurality of interconnected nodes;
informing said at least one other interconnected node having an identity stored in said calling-list register of said one of said plurality of interconnected nodes of said modified entry; and
sending a confirmation message from said at least one other interconnected node said one of said plurality of interconnected nodes having an identity stored in said calling-list register of said at least one other interconnected node after said entry has been modified.

18. The computer-readable medium of claim 17, wherein a computer system that includes said plurality of interconnected nodes does not support functionality to broadcast a command, from said one of said plurality of interconnected nodes, to modify a corresponding TLB entry in TLBs of other of said plurality of interconnected nodes.

19. The computer-readable medium of claim 17, wherein said one of said plurality of interconnected nodes informs said at least one other interconnected node by sending a command to said at least one other interconnected node that includes a virtual address of said entry to be modified in said at least one other interconnected node.

20. The computer-readable medium of claim 19, wherein said at least one other interconnected node modifies said entry when a predetermined memory location in said at least one other interconnected node is updated with said virtual address of said entry to be modified.

21. The computer-readable medium of claim 17, wherein said confirmation message includes a command to modify a predetermined memory location in said one of said plurality of interconnected nodes.

22. A computer system, comprising:
a plurality of interconnected nodes each having a translation lookaside buffer (TLB) for storing virtual memory address conversion information; and
a calling-list register that stores an identity of at least one other interconnected node,
wherein each of said plurality of interconnected nodes has a calling-list register,
wherein said identity of said at least one other interconnected node stored in each calling-list register is different for each calling-list register,
wherein when a first node of said plurality of interconnected nodes modifies an entry in its TLB, said first node informs a second node of said plurality of interconnected nodes having an identity of said second node stored in said calling-list register of said first node of said modified entry, and said second node informs a third node of said plurality of interconnected nodes having an identity of said third node stored in said calling-list register of said second node of said modified entry, and
wherein said third node sends a confirmation message to said second node having an identity stored in said calling-list register of said third node after said entry has been modified, and said second node sends a confirmation message to said first node having an identity stored in said calling list register of said second node after said entry has been modified.

23. The computer system of claim 22, wherein said computer system does not support functionality to broadcast a command, from one of said plurality of interconnected nodes, to modify a corresponding TLB entry in TLBs of other of said plurality of interconnected nodes.

24. The computer system of claim 22, wherein said first node, said second node and said third node are neighboring nodes.

25. The computer system of claim 22, wherein said plurality of interconnected nodes are connected in a ring using a plurality of point-to-point links.

26. The computer system of claim 22, wherein one of said plurality of interconnected nodes is a central processing unit.

27. The computer system of claim 22, wherein said first node informs said second node by sending a command to said second node and said second node informs said third node by sending said command to said third node, wherein said command includes a virtual address of said entry to be modified in said second node and said third node.

28. The computer system of claim 27, wherein said second node modifies said entry in said second node and said third node modifies said entry in said third node when a predetermined memory location in said second node and said third node is updated with said virtual address of said entry to be modified.

29. The computer system of claim 22, wherein said confirmation message includes a command to modify a predetermined memory location in said first node and said second node.

30. A method for purging translation lookaside buffers (TLBs) of a computer system that includes a plurality of interconnected nodes each having a TLB for storing virtual memory address conversion information, comprising the steps of:
storing an identity of at least one other interconnected node in a calling-list register, wherein each of said plurality of interconnected nodes has a calling-list register, and wherein said identity of said at least one other interconnected node stored in each calling-list register is different for each calling-list register;
modifying an entry in said TLB of a first node of said plurality of interconnected nodes;
informing, by said first node, a second node of said plurality of interconnected nodes having an identity of said second node stored in said calling-list register of said first node of said modified entry;
informing, by said second node, a third node of said plurality of interconnected nodes having an identity of said third node stored in said calling-list register of said second node of said modified entry;
sending a confirmation message from said third node to said second node having an identity stored in said calling-list register of said third node after said entry has been modified; and
sending a confirmation message from said second node to said first node having an identity stored in said calling-list register of said second node after said entry has been modified.

31. The method of claim 30, wherein said computer system does not support functionality to broadcast a command, from one of said plurality of interconnected nodes, to modify a corresponding TLB entry in TLBs of other of said plurality of interconnected nodes.

32. The method of claim 30, wherein said first node, said second node and said third node are neighboring nodes.

33. The method of claim 30, wherein said plurality of interconnected nodes are connected in a ring using a plurality of point-to-point links.

34. The method of claim 30, wherein one of said plurality of interconnected nodes is a central processing unit.

35. The method of claim 30, wherein said first node informs said second node by sending a command to said second node and said second node informs said third node by sending said command to said third node, wherein said command includes a virtual address of said entry to be modified in said second node and said third node.

36. The method of claim 30, wherein said second node modifies said entry in said second node and said third node modifies said entry in said third node when a predetermined memory location in said second node and said third node is updated with said virtual address of said entry to be modified.

37. The method of claim 30, wherein said confirmation message includes a command to modify a predetermined memory location in said first node and said second node.

38. A method for purging translation lookaside buffers (TLBs) in a network system having a plurality of nodes that are connected in an arrangement that does not support broadcast TLB-purge commands, comprising the steps of:
storing, in each node, the identity of at least one neighboring node in said network;
invalidating a TLB entry in a first node;
sending a command from said first node to a second node, whose identity is stored in said first node, to perform a write transaction at a first predetermined memory location;

initiating a TLB-purging operation at said second node in response to receipt of said command;

sending a command from said second node to a third node, whose identity is stored in said second node, to perform a write transaction at said first predetermined memory location, in response to receipt of said command from said first node;

initiating a TLB-purging operation at said third node in response to receipt of said command from said second node;

upon completion of said TLB-purging operation at said third node, sending a command to said second node to perform a write transaction at a second predetermined memory location; and sending a command from said second node to said first node, in response to receipt of said command from said third node, to perform a write transaction at said second predetermined memory location, to thereby confirm completion of the TLB-purging operation.

39. The method of claim 38, further including the step of:

inhibiting the sending of said write command from said second node to said first node until the TLB-purging operation is completed at said second node.

40. The method of claim 38, wherein said identities are stored in a respective call-list at each node.

41. The method of claim 40, wherein each call-list is a doubly-linked list containing two node entries.

* * * * *